United States Patent
Kozlitin et al.

(10) Patent No.: US 12,492,450 B2
(45) Date of Patent: Dec. 9, 2025

(54) METHOD FOR SEPARATING LUTETIUM AND YTTERBIUM USING CHROMATOGRAPHY

(71) Applicant: GLOBAL MORPHO PHARMA, La Chapelle sur Erdre (FR)

(72) Inventors: Evgeniy Anatolevich Kozlitin, Lyuberetskiy (RU); Vitaliy Vitalevich Milyutin, Moscow (RU); Lyubov Aleksandrovna Firsova, Moscow (RU); Oleg Viktorovich Haritonov, Moscow (RU); Mihail Vasilevich Logunov, G. Ozersk (RU)

(73) Assignee: GLOBAL MORPHO PHARMA, La Chapelle-sur-Erdre (FR)

( * ) Notice: Subject to any disclaimer, the term of this patent is extended or adjusted under 35 U.S.C. 154(b) by 458 days.

(21) Appl. No.: 18/025,845

(22) PCT Filed: Dec. 15, 2020

(86) PCT No.: PCT/RU2020/000691
§ 371 (c)(1),
(2) Date: Mar. 10, 2023

(87) PCT Pub. No.: WO2022/055386
PCT Pub. Date: Mar. 17, 2022

(65) Prior Publication Data
US 2023/0357890 A1    Nov. 9, 2023

(30) Foreign Application Priority Data

Sep. 11, 2020   (RU) .......................... RU2020130005

(51) Int. Cl.
*C22B 59/00* (2006.01)
*B01D 15/18* (2006.01)
(Continued)

(52) U.S. Cl.
CPC .......... *C22B 59/00* (2013.01); *B01D 15/1871* (2013.01); *B01D 15/362* (2013.01);
(Continued)

(58) Field of Classification Search
CPC .. C22B 59/00; C22B 3/24; C22B 3/42; B01D 15/1871; B01D 15/362; B01D 15/426
(Continued)

(56) References Cited

U.S. PATENT DOCUMENTS 6,716,353 B1    4/2004   Mirzadeh et al.
9,816,156 B2 *  11/2017  Marx ...................... A61P 35/00

FOREIGN PATENT DOCUMENTS

| | | |
|---|---|---|
| RU | 2 542 733 | 2/2015 |
| RU | 2 573 475 | 1/2016 |
| WO | 2013/010686 | 1/2013 |

OTHER PUBLICATIONS

V. V. Milyutin et.al. "K.V. Chmutov's Legacy in Developing the Fundamental Concepts of the Radioactive Elements Chromatography", ISSN 0036-0244, Russian Journal of Physical Chemistry A, 2020, vol. 94, No. 3, pp. 459-464. (Year: 2020).*
(Continued)

*Primary Examiner* — Danielle M. Carda
*Assistant Examiner* — Nazmun Nahar Shams
(74) *Attorney, Agent, or Firm* — NIXON & VANDERHYE

(57) ABSTRACT

The invention relates to the field of separating rare earth elements by chromatography. The claimed method for separating lutetium and ytterbium from acidic solutions resulting from the recycling of irradiated ytterbium-176 targets is carried out using ion exchange chromatography. Ion sorption is performed on a sulphonic cation resin in copper or nickel form, and lutetium and ytterbium are eluted using a solution of a chelator at elevated temperature with the aid of
(Continued)

a system consisting of at least two series connected columns of decreasing diameter, filled with a sulphonic cation resin. The separation of ytterbium and lutetium is carried out in the presence of a bivalent ion of a stable intercalator element selected from the group consisting of cobalt, lead or zinc, in an amount in mEq that is equal to not less than 80% of the total capacity of the last column in the direction of travel of the solution. A solution of ethylenediaminetetraacetic acid or nitrilotriacetic acid is used as the eluent. The technical result is that of increasing the degree of chromatographic separation of lutetium and ytterbium from acidic solutions resulting from, the recycling of ytterbium-176 targets, including targets having a mass greater than 10 g, as well as expanding the range of methods available for separating the aforesaid components.

4 Claims, 6 Drawing Sheets

(51) Int. Cl.
B01D 15/36 (2006.01)
B01D 15/42 (2006.01)
C22B 3/24 (2006.01)
C22B 3/42 (2006.01)

(52) U.S. Cl.
CPC .............. *B01D 15/426* (2013.01); *C22B 3/24* (2013.01); *C22B 3/42* (2013.01)

(58) Field of Classification Search
USPC .......................................................... 75/393
See application file for complete search history.

(56) References Cited

OTHER PUBLICATIONS

International Search Report for PCT/RU2020/000691, mailed Jun. 3, 2021, 3 pages.
Written Opinion of the ISA for PCT/RU2020/000691, mailed Jun. 3, 2021, 4 pages.
Gelis et al., "Optimization of Separation of Ytterbium and Lutetium by Displacement Complexing Chromatography," Journal of Applied Chemistry, vol. 78, No. 9, 2005, pp. 1420-1426, Translated from Russian Journal of Applied Chemistry, vol. 78, No. 9, 2005, pp. 1444-1450.
Kharitonov et al., "Separation and Isolation of radionuclides by the displacement chelating chromatography," Sorption and Chromatographic Processes (Russ.), 2016, vol. 16, No. 3, pp. 291-305.
Kosynkin et al., "Lutetium and Ytterbium Separation by Ion-Exchange Chromatography," Atomic Energy, 2016, vol. 121, No. 6, pp. 443-447, Translated from Russian Atomic Energy, 2016, vol. 121, No. 6, pp. 346-350.

* cited by examiner

METHOD FOR SEPARATING LUTETIUM AND YTTERBIUM USING CHROMATOGRAPHY

CROSS-REFERENCE TO RELATED APPLICATIONS

This application is the U.S. national phase of International Application No. PCT/RU2020/000691 filed Dec. 15, 2020 which designated the U.S. and claims priority to RU RU2020130005 filed Sep. 11, 2020, the entire contents of each of which are hereby incorporated by reference.

TECHNICAL FIELD

The invention relates to methods for separating lutetium and ytterbium and can be used in the processing of an irradiated ytterbium-176 target to obtain pure carrier-free lutetium-177 compounds for nuclear medicine, as well as in chemical technology to obtain purified ytterbium and lutetium compounds.

PRIOR ART

A known method for separating lutetium and ytterbium ions by the method of extraction chromatography comprises sorption and subsequent elution of lutetium and ytterbium with acids of various concentrations on a column. This sorption uses a carrier impregnated with an extractant selective for REE (U.S. Pat. No. 6,716,353, 2004).

Disadvantages of this method is the impossibility of processing ytterbium targets weighing more than 10 mg due to the low capacity of the carriers and poorer separation for greater target weight, high losses of the target component due to the zones of the eluted elements partially overlapping each other, and use of organic extractants.

A known ion exchange multi-column chromatographic method for separating lutetium and ytterbium comprises sorption of ions on a cation exchange resin in ammonium form, elution of lutetium and ytterbium using a solution of complexing agent selected from 2-hydroxyisobutyric acid, citric acid, butyrate, citrate, ethylenediaminetetraacetic acid (EDTA), elution of lutetium from the last column with a concentrated mineral acid (U.S. Pat. No. 9,816,156, 2017).

The disadvantages of this method comprise impossible processing of ytterbium targets weighing more than 10 mg due to the ion separation degree strongly decreasing along with the increasing target weight and a multi-stage process.

A known chromatographic method for separating 177Lu and 176Yb comprises sorption of the starting solution, initial elution of 177Lu from ion exchange column, retaining ytterbium on this column, sending the eluate to the second ion exchange column, where 177Lu is sorbed, sending the eluate from the second column to waste, and eluting 177Lu from the second column. An alpha-isobutyric acid solution is used as an eluent (RU 2542733, 2015).

The disadvantages of this method comprise impossible processing of ytterbium targets weighing more than 10 mg due to the low capacity of the carriers and poorer separation for greater target weight and high losses of the target component due to the zones of the eluted elements partially overlapping each other.

A known ion exchange chromatographic method for separating lutetium and ytterbium comprises sorption and elution of lutetium and ytterbium with a solution of a complexing agent selected from ammonium alpha-hydroxyisobutyrate or EDTA, on coupled columns filled with a cation exchange resin. The method involves at least two or more stages of sorption and elution, which allows processing ytterbium targets weighing up to several grams, since the amount of the macrocomponent (ytterbium) in the sorbed (eluted) mixture of elements decreases from one stage to another (RU 2573475, 2016).

The disadvantage of this method is the duration of the multi-stage process. When the number of stages decreases, the zones of eluted elements partially overlap that inevitably results in lutetium losses.

A known ion exchange chromatographic method for separating lutetium and ytterbium comprises the sorption and elution of lutetium and ytterbium with a solution of a complexing agent, in particular EDTA, on coupled columns filled with a cation exchange resin saturated with a moderating ion, in particular Cu (II) or Fe (III) (V. D. Kosynkin et al., Separating lutetium and ytterbium by ion exchange chromatography, Atomic Energy (Russ.), 2016, vol. 121, no. 6, pp. 346-350).

The disadvantage of this method is the high losses of target components due to overlapping zones of eluted elements.

The technically closest solution to the claimed invention is an ion exchange chromatographic method for separating lutetium and ytterbium by comprising the sorption and elution of lutetium and ytterbium with a solution of a complexing agent, in particular, EDTA on two or more serially connected columns with a decreasing diameter, filled with a cation exchange resin saturated with a moderator ion selected from Cu (II) or Ni (II) at an elevated temperature. The method provides that the elution rate (ml·min/cm$^2$) is determined by the column, along which the leading edge of the target components moves, and remains constant throughout the entire elution process. Such serial connection of several columns provides the required number of separation bands in the system, and the use of columns with a successively decreasing diameter allows forming elongated zones of elements minimally overlapping each other. The capacity of the resin in the first (sorption) column corresponds to the maximum mass of the target for which the system is designed (V. M. Gelis et al., Selecting the optimal conditions for separating ytterbium and lutetium by displacement complexing chromatography, Journal of Applied Chemistry (Russ.), 2005, vol. 78, No. 9, pp. 1444-1450).

The disadvantage of this method is the inefficient processing of irradiated ytterbium targets since the weight difference between the parent and child elements is so great that even with the maximum number of separation bands and elongation of the zones of the separated elements, the zones of the separated elements overlap each other. Therefore, the disadvantage of the method chosen as the closest prior art is the impossible separation of the pure lutetium microcomponent on the background of ytterbium macroquantities in the irradiated target.

SUMMARY

The objective of the present invention is to develop a new chromatographic method for separating lutetium and ytterbium ions from processing solutions of irradiated ytterbium targets of almost any weight, providing a higher degree of separating the said ions due to the exclusion of the mutually overlapping zones of the elements to be separated.

This problem is solved by the claimed ion-exchange chromatographic method for separating lutetium and ytterbium from acid solutions for processing irradiated ytterbium-176 targets, comprising sorption on a cation exchange resin and elution of lutetium and ytterbium with a complexing agent solution using a system of at least two serially connected columns with a decreasing diameter filled with sulfonic cation exchange resin in copper or nickel form, while ytterbium and lutetium are separated in the presence of a bivalent ion of a stable intercalator element selected from the group of cobalt, lead or zinc, taken in a mEq amount equal to at least 80% of the total capacity of the last column, wherein the used eluent is an ethylenediaminetetraacetic acid (EDTA) or nitrilotriacetic acid (NTA) solution.

According to this method, the intercalator element is added into the process either preliminarily at the stage of converting the sulfonic cation exchanger into a copper or nickel form, or into the solution at the stage of sorption or elution.

Preferably, the used eluents are ethylenediaminetetraacetic or nitrilotriacetic acid solutions with a concentration of 0.04 to 0.08 mol/l and pH of 5 to 9.

Preferably, the temperature in the elution stage is 70 to 80° C.

The optimal number of serially connected columns and dimensions thereof, including diameter and height, are selected as known by those skilled in the art, taking into account the composition of the starting solution fed to the chromatographic separation and the required purity of the target products, for example, using the method described in the selected prior art.

The technical effect achieved in the scope of the independent claim features is a higher degree of chromatographic separation of lutetium and ytterbium, in particular, from the ytterbium-176 target process solutions of any weight.

The claimed technical effect vs. the prior art is achieved through experimental selection of the added intercalator elements selected from cobalt, lead or zinc as bivalent ions and selection of the claimed eluents as a complexing agent. When ethylenediaminetetraacetic acid or nitrilotriacetic acid solutions are used as an eluent, precisely the claimed intercalator elements wedge between the lutetium and ytterbium zones and completely isolate them from each other. An essential feature is the amount of added intercalator element of not less than 80% of the capacity of the last separation column. If the added amount of the intercalator element is below the claimed level, the separation quality decreases of due to the approaching zones of the elements to be separated, that is, no technical effect is achieved.

It should be noted that if an intercalator element is added in any amount of 80% or more of the capacity of the last separation column, this will unambiguously achieve the claimed technical effect providing a higher degree of chromatographic separation of lutetium and ytterbium vs. the prior art. The maximum amount of the intercalator element is not limited hereby since in each specific case it can be selected by a person skilled in the art in view of the economic reasons and the required purity of the products to be obtained. In the examples below, the maximum cost-effective amount of the added intercalator element was 120%.

According to the prior art, it is principally possible to use mobile intercalator elements for separating certain radionuclides (O. V. Kharitonov et al., Isolation and separation of radionuclides using displacement complexing chromatography, Sorption and Chromatographic Processes (Russ.), 2016, vol. 16, No. 3, pp. 291-305). This article provides the information on the separation of radionuclides from the spent nuclear fuel process solutions and from irradiated targets on a sulfonic cation exchange resin to recover Gd-153, Cf-252, Bk-249. It was found expedient to elute the mentioned radioactive elements with DTPA or EDTA solutions with added citric acid in the presence of intercalator $Cd^{2+}$ and $Zn^{2+}$ ions. This article concludes that in order to separate an arbitrary pair of ions of rare earth or transuranium elements with the formation of their own chromatographic bands (zones) in each variant, it is necessary to define the individual separation process conditions, including the eluent composition and the intercalator element, to ensure the mutually isolated zones separation the certain elements to be separated. The conclusion about the impossible extrapolation of the results obtained for some pairs of ions to other pairs of ions to be separated can also be drawn from the following articles: E. A. Chuveleva et al., Isolation of gadolinium-153 from irradiated europium targets by chromatographic method using separating ions, Radiochemistry (Russ.), 1995, vol. 37, No. 6, pp. 522-527; L. A. Firsova et al., Isolation of holmium from an erbium target by a chromatographic method using a separating ion, Journal of Physical Chemistry (Russ.), 1997, vol. 71, No. 10, pp. 1882-1884.

The prior art does not disclose any intercalator element used for the chromatographic separation of lutetium and ytterbium. Meanwhile, in view of the high complexation constants of the heaviest elements of the rare earth series with ethylenediaminetetraacetic and nitrilotriacetic acids, the usability of the selected intercalator elements in the chromatographic separation of lutetium and ytterbium is not obvious. Moreover, on the basis of the prior art, it was impossible to assume that the process of separating these elements in the presence of bivalent ions selected from cobalt, lead or zinc would provide a significantly higher degree of separation of these ions from the irradiated ytterbium-176 target process solutions, regardless of the target weight.

Thus, the claimed set of features is novel and provides a technical effect, which is not obvious in view of the known prior art information, that allows concluding that the proposed invention meets the patentability conditions of novelty and inventive step.

BRIEF DESCRIPTION OF THE DRAWINGS

The feasibility of the proposed technical solution is supported by the following examples.

The achieved technical effect is confirmed by presented Figures and in the Table below.

DESCRIPTION OF THE PREFERRED EMBODIMENTS

Examples

Example 1 (Prior Art)

Figure 1:
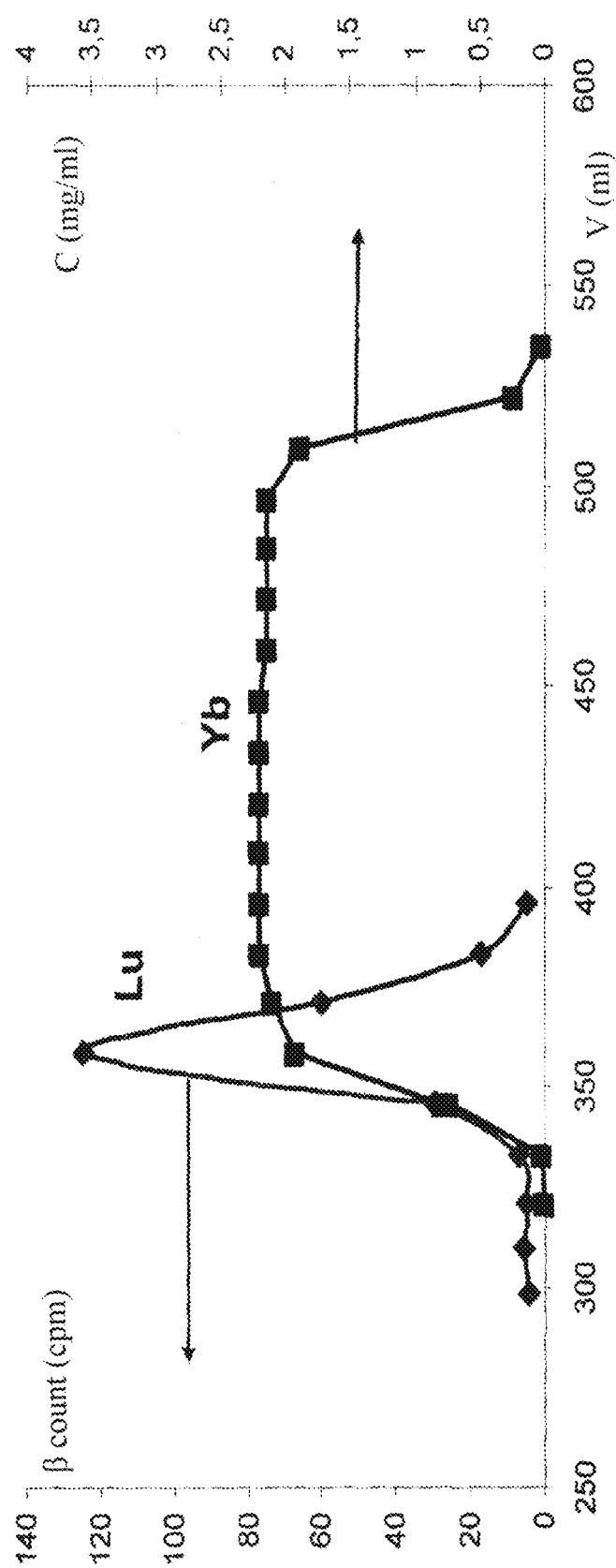
FIG. 1 represents a chromatogram for separating Yb—Lu mixture without intercalator element on Tokem-308 sulfonic cation exchange resin. Eluent composition: 0.05 mol/l NTA, pH 7.7.

The separation of 400 mg of ytterbium and trace amount (~1 MBq) of lutetium-177 was carried out on two serially connected columns having a diameter of 9 mm and 6 mm filled with Tokem-308 sulfonic cation exchange resin in nickel form with a grain size of 0.22 mm. The first column contained 50 ml and the second contained 20 ml of sulfonic cation exchange resin. The mixture to be separated was sorbed on the first column from a nitric acid solution containing 400 mg of Yb and ~1 MBq of Lu-177 at pH 2 and temperature of 20 to 25° C.

After sorption, the first column was washed with distilled water and the eluent solution of 0.05 mol/l HTA at pH 7.7 was passed through at a rate of 4 ml·min/cm² and temperature of 70° C. When the lutetium front approached the bottom of the column, the second column was connected. The solution at the outlet of the second column was collected by fractions and the concentration of ytterbium ions and the specific activity of lutetium-177 were analyzed therein.

Example 2

The separation of 54 mg of ytterbium and trace amount (~1 MBq) of lutetium-177 was carried out on two serially connected columns having a diameter of 8 mm and 6.5 mm, respectively, filled with Tokem-308 sulfonic cation exchange resin in a copper form with a grain size of 0.22 mm. The first column contained 42 ml of sulfonic cation exchange resin and the second column contained 13 ml of sulfonic cation exchange resin. The total capacity of the cation exchange resin in the second column was about 26 mEq. The mixture to be separated was sorbed on the first column from a nitric acid solution containing 54 mg of Yb and ~ 1 MBq of Lu-177, at pH 2 and temperature of 20 to 25° C. The intercalator element (cobalt) in the amount of 31 mEq (120% of the total capacity of the last column) was added at the stage of converting the first column to a copper form.

After sorption, the first column was washed with distilled water, the eluent solution (0.04 mol/l EDTA, pH 5.0) was passed through at a rate of 4 ml·min/cm² and temperature of 80° C. When the lutetium front approached the bottom of the column, the second column was connected. The solution at the outlet of the last column was collected by fractions and the concentration of ytterbium ions and the specific activity of lutetium-177 were analyzed therein.

Example 3

The separation of 250 mg of ytterbium and trace amount (~1 MBq) of lutetium-177 was carried out on three serially connected columns with a diameter of 10, 6 and 3.4 mm, respectively, filled with Tokem-308 sulfonic cation exchange resin in a nickel form with a grain size of 0.22 mm. The first column contained 72 ml, the second and third columns contained 40 and 10 ml of sulfonic cation exchange resin, respectively. The total capacity of the cation exchange resin in the third column was about 20 mEq. The mixture to be separated was sorbed on the first column from a nitric acid solution containing 250 mg of Yb and ~1 MBq of Lu-177 at pH 2 and temperature of 20 to 25° C. The intercalator element (cobalt) in the amount of 20 mEq (100% of the total capacity of the last column) was added to the starting solution at the stage of sorption.

After sorption, the first column was washed with distilled water, the eluent solution (0.04 mol/l NTA, pH 7.7) was passed through at a rate of 4 ml·min/cm² and temperature of 70° C. When the lutetium front approached the bottom of the column, each following column was connected. The solution at the outlet of the last column was collected by fractions and the concentration of ytterbium ions and the specific activity of lutetium-177 were analyzed therein.

Example 4

The separation of 400 mg of ytterbium and trace amount (~1 MBq) of lutetium-177 was carried out on two serially connected columns with a diameter of 8 mm and 6.5 mm, respectively, filled with KU-2x8 sulfonic cation exchange resin in a copper form with a grain size of 0.125 to 0.25 mm. The first column contained 42 ml and the second contained 3 ml of the sulfonic cation exchange resin. The total capacity of the cation exchange resin in the second column was about 26 mEq. The mixture to be separated was sorbed on the first column from a nitric acid solution containing 400 mg of Yb and ~1 MBq of Lu-177 at pH 2 and temperature of 20 to 25° C. Further, the intercalator element (Zn) was added to the eluent solution in the amount of 21 mEq (80% of the total capacity of the last column).

After sorption, the first column was washed with distilled water, the eluent solution (0.04 mol/l EDTA, pH 5.7) was passed through at a rate of 4 ml·min/cm² and temperature of 80° C. When the lutetium front approached the bottom of the column, the second column was connected. The solution at the outlet of the last column was collected by fractions and the concentration of ytterbium ions and the specific activity of lutetium-177 were analyzed therein.

Example 5

The separation of 400 mg of ytterbium and trace amount (~1 MBq) of lutetium-177 was carried out on three serially connected columns with a diameter of 10, 6 and 3.4 mm, respectively, filled with Tokem-308 sulfonic cation exchange resin in a nickel form with a grain size of 0.22 mm. The first column contained 72 ml, the second and third columns contained 40 and 12 ml of sulfonic cation exchange resin, respectively. The total capacity of the cation exchange resin in the third column was about 24 mEq. The mixture to be separated was sorbed on the first column from a nitric acid solution containing 400 mg of Yb and ~1 MBq of Lu-177 at pH 2 and temperature of 20 to 25° C.

After sorption, the first column was washed with distilled water, the eluent solution (0.08 mol/l NTA, pH 7.7) was passed through at a rate of 4 ml·min/cm² and temperature of 70° C. Further, the intercalator element (Pb) was added to the eluent solution in the amount of 21 mEq (88% of the total capacity of the last column). When the lutetium front approached the bottom of the column, each following column was connected. The solution at the outlet of the last column was collected by fractions and the concentration of ytterbium ions and the specific activity of lutetium-177 were analyzed therein.

Example 6

The separation of 5.4 g of ytterbium and trace amount (~1 MBq) of lutetium-177 was carried out on four serially connected columns with a diameter of 16, 10, 6 and 4.4 mm, respectively, filled with Cromalite CGC200x8 sulfonic cation exchange resin in a nickel form with a grain size of 0.15 to 0.30 mm. The first column contained 180 ml, the second, third and fourth columns contained 72, 40 and 12 ml of sulfonic cation exchange resin, respectively. The total capacity of the cation exchange resin in the fourth column is about 24 mEq. The mixture to be separated was sorbed on the first column from a nitric acid solution containing 5.4 mg of Yb and ~1 MBq of Lu-177 at pH 2 and temperature of 20 to 25° C.

After sorption, the first column was washed with distilled water, the eluent solution (0.08 mol/l NTA, pH 8.7) was passed through at a rate of 4 ml·min/cm$^2$ and temperature of 80° C. Further, the intercalator element (Pb) was added to the eluent solution in the amount of 21 mEq (88% of the total capacity of the last column). When the lutetium front approached the bottom of the column, each following column was connected. The solution at the outlet of the last column was collected by fractions and the concentration of ytterbium ions and the specific activity of lutetium-177 were analyzed therein.

The Yb—Lu mixture separation efficiency of the claimed method vs. the prior art is represented in the Table below.

TABLE

| Example No. | Intercalator element | Post-separation Yb content in Lu, % |
|---|---|---|
| 1 (prior art) | — | 31.8 |
| 2 | Co | <3 |
| 3 | Co | <3 |
| 4 | Zn | 6.0 |
| 5 | Pb | 3.1 |
| 6 | Pb | 0.2 |

Figure 2:
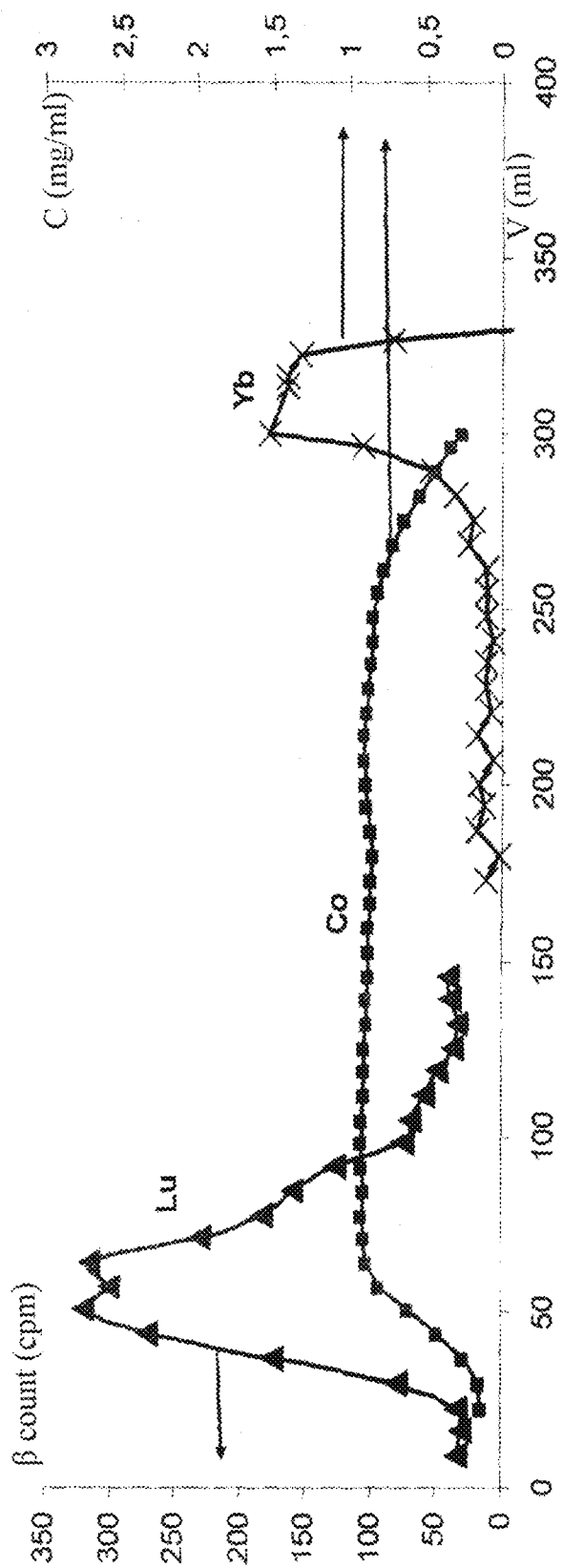
FIG. 2 represents a chromatogram for separating Yb—Lu mixture with intercalator element (Co) on Tokem-308 sulfonic cation exchange resin. Eluent composition: 0.04 mol/l EDTA, pH 5.0.
Figure 3:
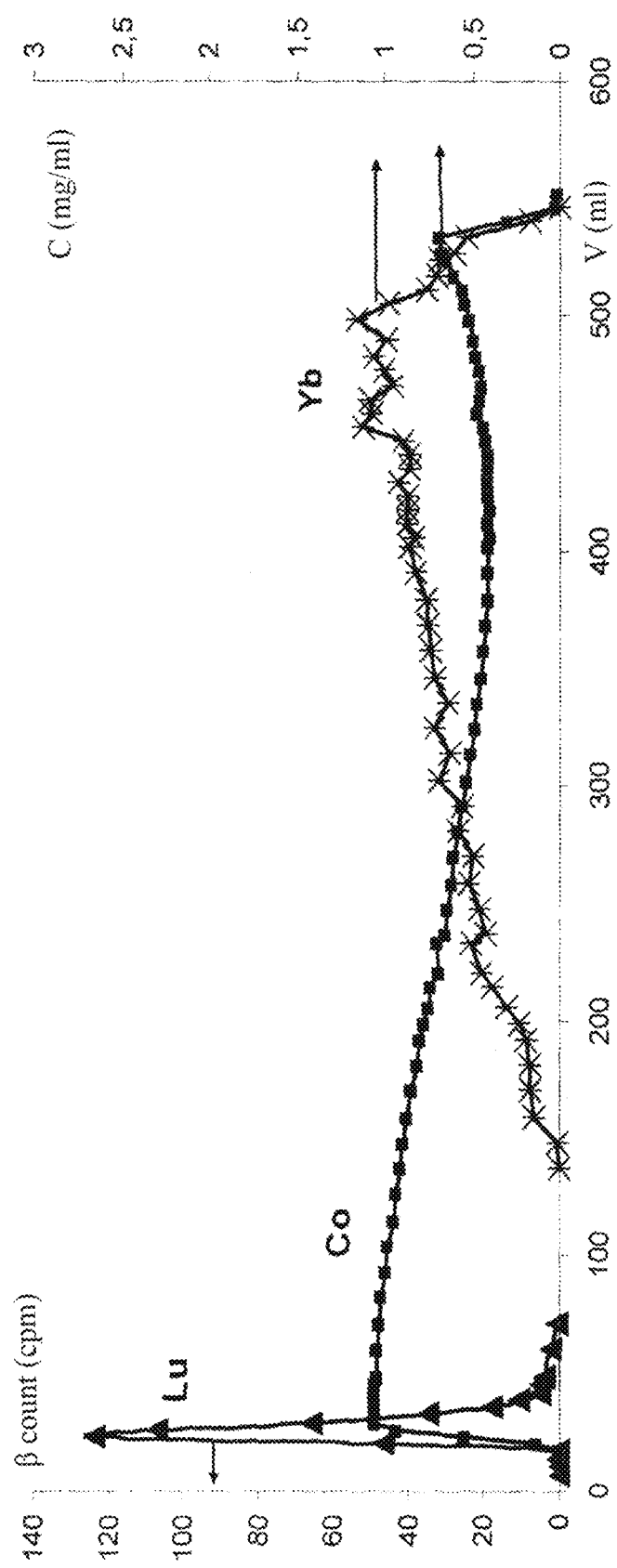
FIG. 3 represents a chromatogram for separating Yb—Lu mixture with intercalator element (Co) on Tokem-308 sulfonic cation exchange resin. Eluent composition: 0.04 mol/l NTA, pH 7.7.
Figure 4:
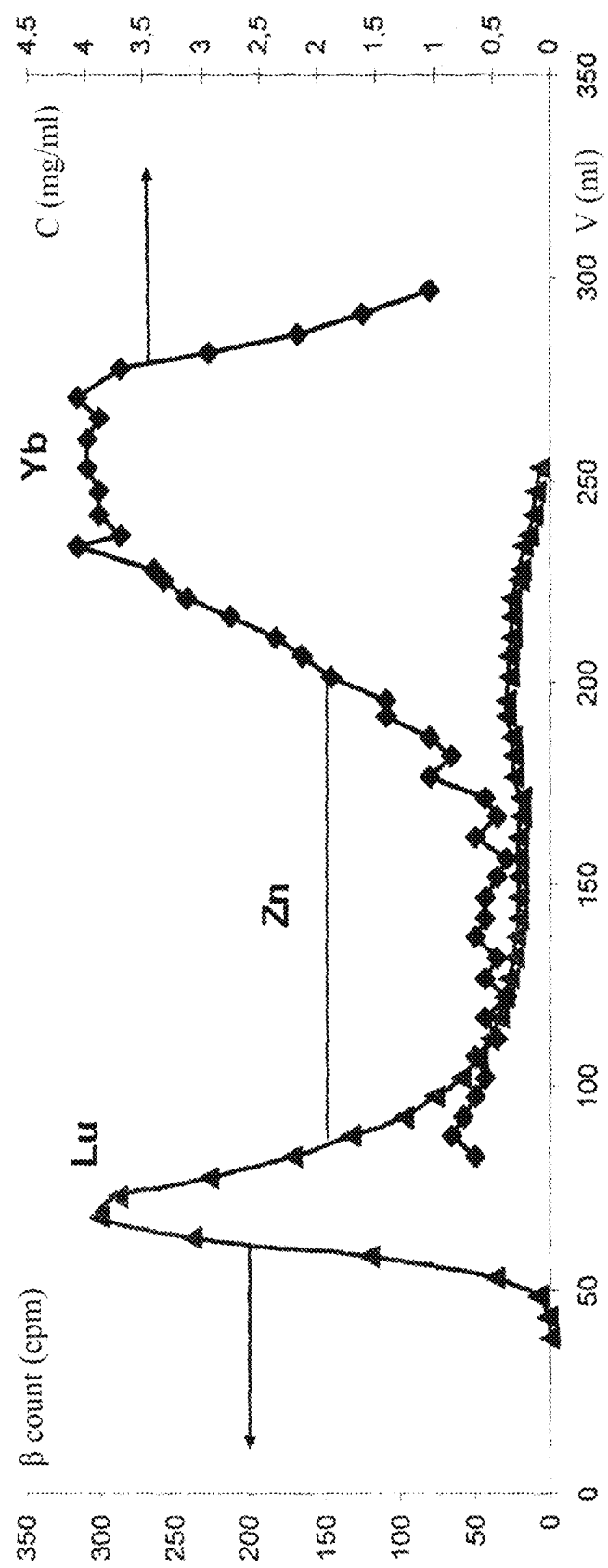
FIG. 4 represents a chromatogram for separating Yb—Lu mixture with intercalator element (Zn) on a KU-2x8 sulfonic cation exchange resin. Eluent composition: 0.04 mol/l EDTA, pH 5.7.
Figure 5:
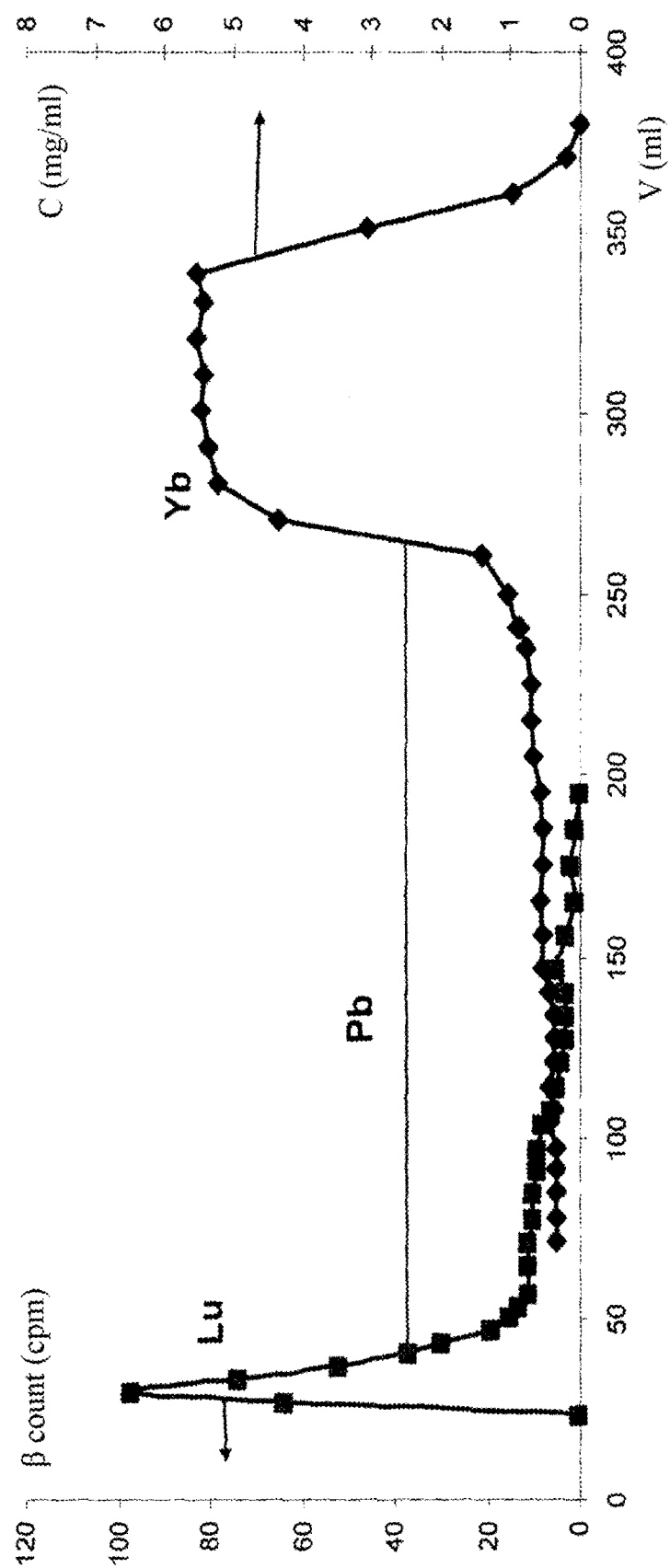
FIG. 5 represents a chromatogram for separating Yb—Lu mixture with intercalator element (Pb) on Tokem-308 sulfonic cation exchange resin. Eluent composition: 0.08 mol/l EDTA, pH 7.7.
Figure 6:
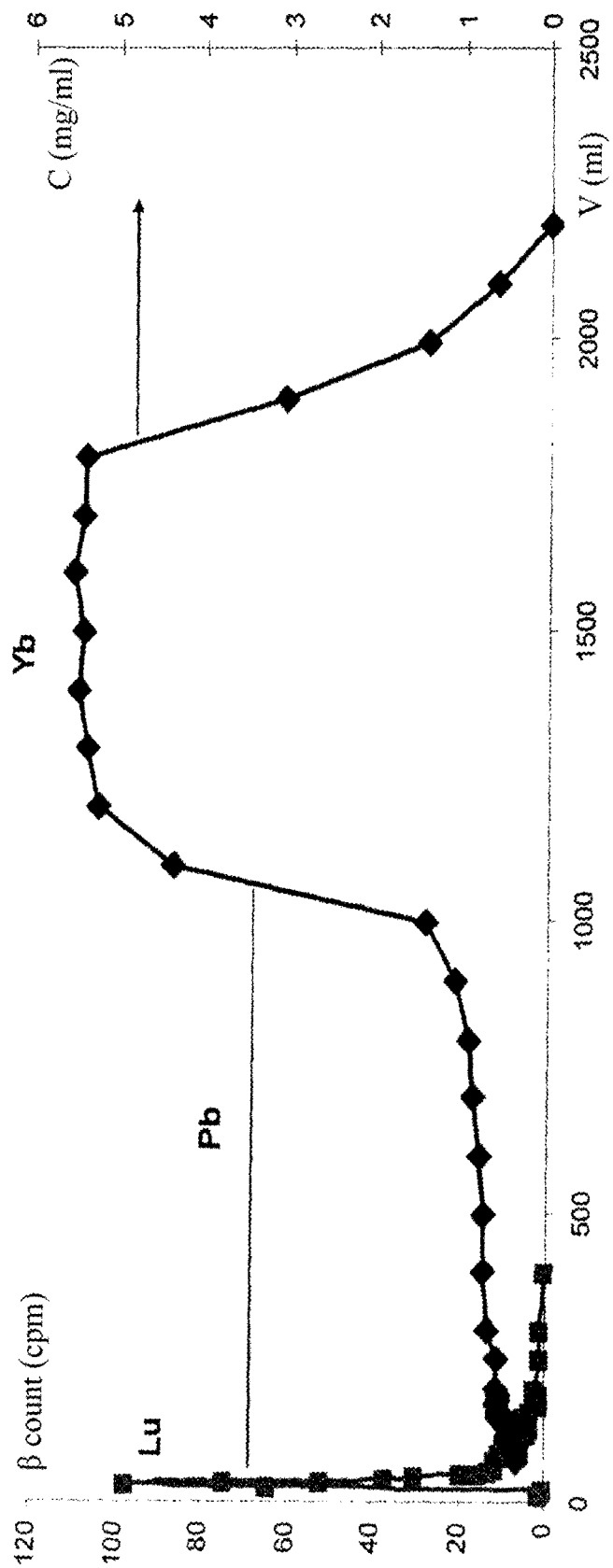
FIG. 6 represents a chromatogram for separating Yb—Lu mixture with intercalator element (Pb) on Cromalite CGC200x8 sulfonic cation exchange resin. Eluent composition: 0.08 mol/l NTA, pH 8.7.

The data presented in FIGS. 1-6 and in the Table show that the chromatographic separation of a solution containing a macroquantity of Yb and a microquantity of Lu carried out in accordance with the claimed invention achieves higher separation efficiency of Yb/Lu pair as compared to the prior art. The Table shows the residual Yb percentage in Lu by weight of the original content. As follows from the data in the Table, the separation efficiency of the claimed pair of ions achieved in specific examples according to the proposed invention is 6-160 times higher than that of the prior art. It can be seen from the examples that the effective separation of ytterbium and lutetium is achieved regardless of the weight of the initial ytterbium-176 target, while the separation of ytterbium and lutetium under the prior art conditions yields unsatisfactory results due to the overlapping zones (bands) of these ions.

The proposed method can be implemented both in conventional displacement chromatography and in high-speed pressure chromatography, which expands the range of effective methods for separating lutetium and ytterbium ions.

INDUSTRIAL APPLICABILITY

The proposed invention can be used in nuclear medicine when processing an irradiated ytterbium-176 target to obtain pure carrier-free lutetium-177 compounds and in chemical technology to obtain purified ytterbium and lutetium compounds.

The invention claimed is:

1. A method for separating lutetium and ytterbium from acidic solutions for processing irradiated ytterbium-176 targets by ion-exchange chromatography, comprising sorption on a cation exchange resin and elution of lutetium and ytterbium with a complexing agent solution at an elevated temperature using a system consisting of at least two serially connected columns with a decreasing diameter filled with sulfonic cation exchange resin in copper or nickel form, wherein ytterbium and lutetium are separated in the presence of a bivalent ion of a stable intercalator element selected from the group consisting of cobalt, lead and zinc, wherein the stable intercalator element is taken in an amount in mEq equal to at least 80% of the total capacity of the last column, and a solution of ethylenediaminetetraacetic acid or nitrilotriacetic acid is used as the eluent.

2. The method of claim 1 wherein the intercalator element is added into the process either preliminarily at the stage of converting sulfonic cation exchange resin to the copper or nickel form, or into the solution at the stage of sorption or elution.

3. The method of claim 1 wherein the used eluents comprise ethylenediaminetetraacetic or nitrilotriacetic acid solutions with a concentration of 0.04 to 0.08 mol/l at pH of 5 to 9.

4. The method of claim 1 wherein lutetium and ytterbium are eluated at a temperature of 70 to 80° C.

* * * * *